(12) United States Patent
Zhou et al.

(10) Patent No.: US 6,402,157 B1
(45) Date of Patent: Jun. 11, 2002

(54) BRUSH SEAL AND METHOD OF USING BRUSH SEAL

(75) Inventors: Ming Zhou, Reading, MA (US); Sal Albert Leone, Scotia, NY (US); Susan Marie Hyde, Piedmont, SC (US); Bruce Miller, Fairfield; Peter A. Stinnett, Mason, both of OH (US)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 09/682,325

(22) Filed: Aug. 20, 2001

(51) Int. Cl.[7] ............................................... F16J 15/44
(52) U.S. Cl. ..................................... 277/355; 277/421
(58) Field of Search ................................. 277/355, 421

(56) References Cited

U.S. PATENT DOCUMENTS

| | | | | |
|---|---|---|---|---|
| 885,032 A | * | 4/1908 | Ferranti | 277/355 |
| 4,756,536 A | * | 7/1988 | Belcher | 277/355 |
| 5,026,252 A | * | 6/1991 | Heffelner | 415/174.2 |
| 5,066,024 A | * | 11/1991 | Reisinger et al. | 277/355 |
| 5,066,025 A | * | 11/1991 | Hanrahan | |
| 5,090,710 A | * | 2/1992 | Flower | |
| 5,114,159 A | * | 5/1992 | Baird et al. | 277/355 |
| 5,474,305 A | * | 12/1995 | Flower | 277/355 |
| 5,597,167 A | * | 1/1997 | Snyder et al. | |
| 5,630,590 A | * | 5/1997 | Bouchard et al. | 277/355 |
| 6,027,121 A | * | 2/2000 | Cromer et al. | 277/347 |
| 6,045,134 A | * | 4/2000 | Turnquist et al. | 277/355 |
| 6,318,728 B1 | * | 11/2001 | Addis et al. | 277/355 |

\* cited by examiner

*Primary Examiner*—Anthony Knight
*Assistant Examiner*—Alison K. Pickard
(74) *Attorney, Agent, or Firm*—Hunton & Williams

(57) ABSTRACT

The invention provides a brush seal, and a method of using a brush seal, for providing a seal between a support housing and a rotating shaft. The brush seal comprises a support portion; a back plate connected to and extending from the support portion on a back side of the support portion. The brush seal further includes a set of bristles attached to the support portion, the back plate disposed on a back side of the set of bristles and supporting the set of bristles. The brush seal further includes at least one fitting portion connected to and extending from the support portion, each of the at least one fitting portions configured to mate with a corresponding slot in the support housing so as to prevent mis-fit of the brush seal in the support housing.

21 Claims, 4 Drawing Sheets

BRUSH SEAL AND METHOD OF USING BRUSH SEAL

FIELD OF THE INVENTION

The invention relates to brush seals and methods of using brush seals.

BACKGROUND OF THE INVENTION

Brush seals are utilized in a wide variety of environments to provide a seal between a housing and a rotating shaft disposed in the housing, for example. Illustratively, brush seals may be utilized in power generation turbines. For example, the rotating shaft may be a rotor in the power generation turbine. Brush seal construction typically includes a set of bristles. The set of bristles is annular shaped and may be mounted on some type of supporting structure. Also, the set of bristles may be contained between a front plate and a back plate, which might be integral with the supporting structure, for example. Typically, the set of bristles, the front plate and the back plate are each annular shaped so as to encircle the rotating shaft that is to be sealed.

Each bristle in the set of bristles is oriented with the rotating shaft in what might be characterized as a cant angle. If the cant angle of the set of bristles is positioned in the wrong direction, any contact of the rotating shaft with the set of bristles, i.e., the bristle pack, will instantaneously damage the brush seal. These and other potential problems are present utilizing known techniques for installing and using brush seals.

BRIEF SUMMARY OF THE INVENTION

In accordance with one aspect of the invention, a brush seal provides a seal between a support housing and a rotating shaft, the brush seal comprising a support portion; a back plate connected to and extending from the support portion on a back side of the support portion; a set of bristles attached to the support portion, the back plate disposed on a back side of the set of bristles and supporting the set of bristles; and at least one fitting portion connected to and extending from the support portion, each of the at least one fitting portion configured to mate with a corresponding slot in the support housing so as to prevent mis-fit of the brush seal in the support housing.

In accordance with a further aspect, the invention provides a method for preventing the mis-fit of a brush seal into a slot within a support housing, the slot having geometrical dimensions, and the brush seal for providing a seal between the support housing and a rotating shaft, the method comprising the steps of providing a brush seal, the brush seal comprising a support portion; a back plate connected to and extending from the support portion on a back side of the support portion; a set of bristles attached to the support portion, the back plate disposed on a back side of the set of bristles and supporting the set of bristles; and at least one fitting portion connected to and extending from the support portion, each of the at least one fitting portion configured to mate with the slot in the support housing. The method further includes determining a geometry of the slot in the support housing; determining if the at least one fitting portion of the brush seal possesses geometry that corresponds to the geometry of the slot; positioning the at least one fitting portion within the support housing, so as to connect the brush seal with the support housing, if the at least one fitting portion possesses a geometry that corresponds to the geometry of the slot of the support housing; and obtaining an additional brush seal if the at least one fitting portion of the brush seal does not possess a geometry that corresponds to the geometry of the slot of the support housing.

In accordance with a further aspect, the invention provides a kit of brush seals for providing a seal between a support housing and a rotating shaft, the kit of brush seals including a first brush seal, the first brush seal including a first support portion; a first back plate connected to and extending from the first support portion on a back side of the first support portion; a first set of bristles attached to the first support portion, the first back plate disposed on a back side of the first set of bristles and supporting the first set of bristles; and at least one first fitting portion connected to and extending from the first support portion, each of the at least one first fitting portion configured to mate with a first corresponding slot in the support housing so as to prevent mis-fit of the first brush seal in the support housing. The kit further includes a second brush seal, the second brush seal including a second support portion; a second back plate connected to and extending from the second support portion on a back side of the second support portion; a second set of bristles attached to the second support portion, the second back plate disposed on a back side of the second set of bristles and supporting the second set of bristles; and at least one second fitting portion connected to and extending from the second support portion, each of the at least one second fitting portion configured to mate with a second corresponding slot in the support housing so as to prevent mis-fit of the second brush seal in the support housing; wherein the at least one first fitting portion is geometrical shaped different than the at least one second fitting portion; wherein each of the first brush seal and the second brush seal is fittable into a first slot in the support housing and a second slot in the support housing, respectively; and wherein each of the first brush seal and the second brush seal is not fittable into the second slot in the support housing and the first slot in the support housing, respectively.

In accordance with a further aspect, the invention provides a brush seal for providing a seal between a support housing and a rotating shaft, the brush seal comprising a support portion; a back plate connected to and extending from the support portion on a back side of the support portion; a front plate connected to and extending from the support portion on a front side of the support portion; a set of bristles attached to the support portion, the back plate disposed on a back side of the set of bristles and supporting the set of bristles, and the front plate disposed on a front side of the set of bristles and supporting the set of bristles; and at least one fitting portion connected to and extending from the support portion, each of the at least one fitting portions configured to mate with a corresponding slot in the support housing so as to prevent mis-fit of the brush seal in the support housing, the support portion being integrally formed with each of the at least one fitting portions.

In accordance with a further aspect, the invention provides a method for preventing the mis-fit of a brush seal into a slot within a support housing in a turbine, the slot having geometrical dimensions, and the brush seal for providing a seal between the support housing in the turbine and a rotating shaft, the method comprising the steps of providing a brush seal, the brush seal comprising a support portion; a front plate connected to and extending from the support portion on a front side of the support portion; a back plate connected to and extending from the support portion on a back side of the support portion; a set of bristles attached to the support portion, the back plate disposed on a back side of the set of bristles and supporting the set of bristles, the front plate disposed on a front side of the set of bristles and supporting the set of bristles; and at least one fitting portion connected to and extending from the support portion, each of the at least one fitting portion configured to mate with the slot in the support housing. The method further includes determining a geometry of the slot in the support housing; determining if the at least one fitting portion of the brush seal possesses geometry that corresponds to the geometry of the slot; positioning the at least one fitting portion within the support housing, so as to connect the brush seal with the support housing, if the at least one fitting portion possesses a geometry that corresponds to the geometry of the slot of the support housing; and obtaining an additional brush seal if the at least one fitting portion of the brush seal does not possess a geometry that corresponds to the geometry of the slot of the support housing; wherein the at least one fitting portion is two fitting portions, the two fitting portions including a front fitting portion and a back fitting portion, and wherein the front fitting portion is connected to and extends from the front side of the support portion; and the back fitting portion is connected to and extends from the back side of the support portion, the front fitting portion having a geometry and the back fitting portion having a geometry, the geometry of the front fitting portion being different than the geometry of the back fitting portion.

BRIEF DESCRIPTION OF THE DRAWINGS

The present invention can be more fully understood by reading the following detailed description together with the accompanying drawings, in which like reference indicators are used to designate like elements, and in which.

DETAILED DESCRIPTION OF THE INVENTION

Hereinafter, aspects of the brush seal and methods of using the brush seal in accordance with various embodiments of the invention will be described. As used herein, any term in the singular may be interpreted to be in the plural, and alternatively, any term in the plural may be interpreted to be in the singular.

The brush seals and methods of using the brush seals of the invention are directed to the above stated problems, as well as other problems, that are present in conventional techniques. As discussed above, assembly of a brush seal, or a segment of a brush seal, with the cant angle of the set of bristles in the wrong direction, will cause immediate damage to the brush seal. The brush seal and method of using the brush seal of the invention provide for the cross-section of a brush seal to be constructed in such a way, in conjunction with a support housing, such that the brush seal cannot be installed in the wrong direction.

Further, it should be appreciated that multiple brush seals may be installed in a particular operating system. These multiple brush seals may well be of different construction due to the varied conditions in which each respective brush seal will be subjected to in an operating system. For example, different brush seals may have different pressure capabilities. Accordingly, different brush seal designs and construction are used for different locations in the same operating system or machine. This creates another opportunity for installation mistakes relating to the brush seals. For example, a mistake might occur when a brush seal is installed in the wrong slot in a support housing of the operating system. For example, as is described in further detail below, a left-handed seal and a right-handed seal might be utilized in the same machine. If one brush seal is accidentally installed in the wrong slot in a housing, that brush seal will be damaged as a result of the wrong direction of the bristle cant angle. Accordingly, the brush seal and method of using the brush seal of the invention provide for the construction of the cross section of a brush seal in such a way as to prevent the installation, by a field installer for example, of the brush seal in a wrong direction, or in a wrong location.

Hereinafter, the brush seals and methods of using the brush seals in accordance with embodiments of the invention will be explained in further detail. The brush seal and method of using the brush seal of the invention provide a method for designing the cross section geometry of a brush seal so that it is impossible to install the brush seal in a wrong direction, or alternatively, to install the brush seal designed for one location into another brush seal slot, in the situation where multiple brush seals are used in the same machine.

Figure 1:
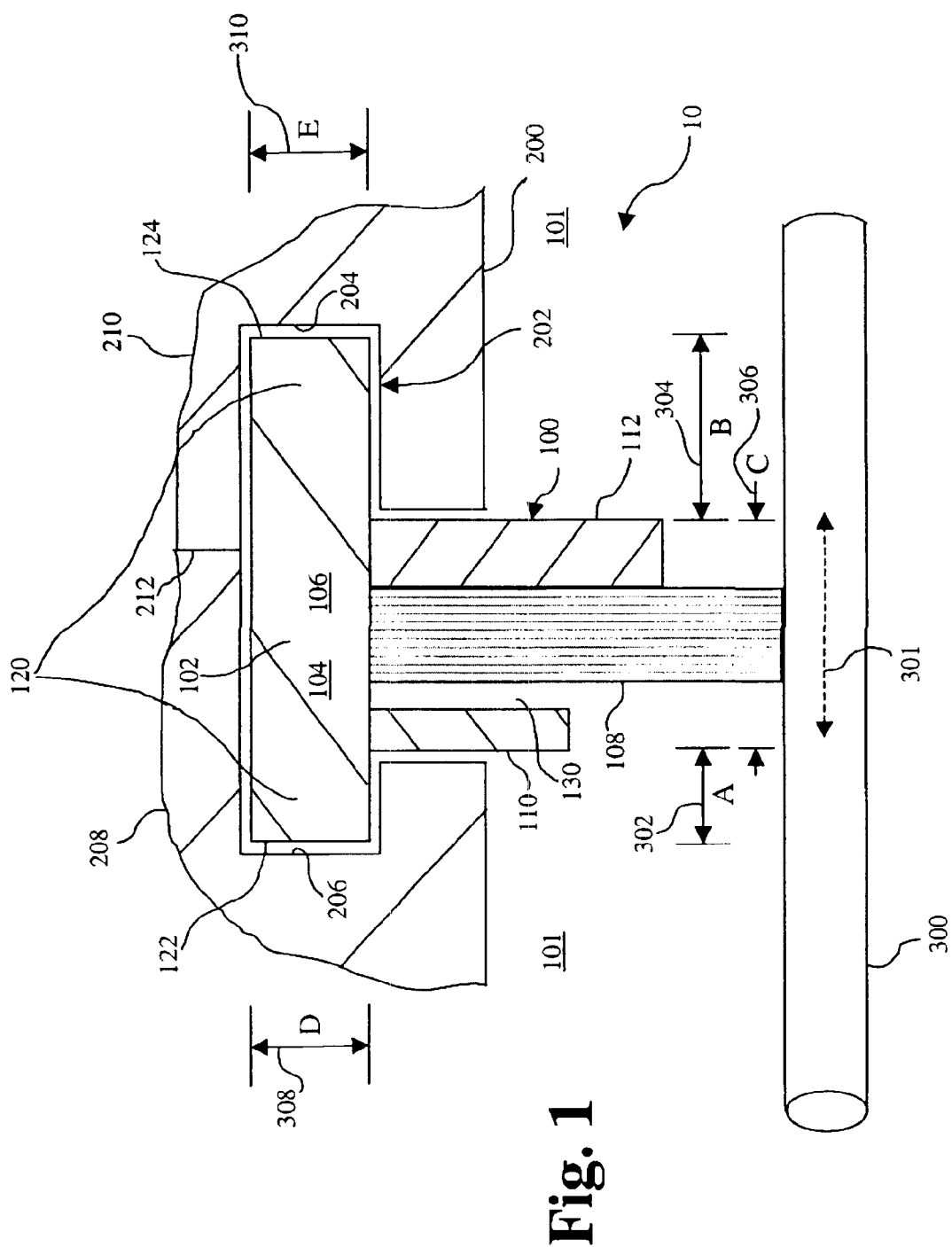
FIG. 1 is a cross-sectional diagram of a housing and brush seal in accordance with one embodiment of the invention.

FIG. 1 is a cross-sectional diagram showing a brush seal assembly in accordance with one embodiment of the invention. Specifically, FIG. 1 shows a brush seal assembly 10. The brush seal assembly 10 includes an annular brush seal 100 that is mounted within a support housing 200. In particular, the brush seal 100 is mounted within a passage 101, or other cavity, in the support housing 200 that is also shown in cross-section in FIG. 1. A rotating shaft 300 is positioned to pass through the passage 101. The brush seal 100 provides a seal between the support housing 200 and the rotating shaft 300, as shown in FIG. 1.

Accordingly, the annular shaped brush seal 100, a cross-section of which is shown in FIG. 1, surrounds the rotating shaft 300. For example, the rotating shaft 300 may be a rotor in a power generation turbine. Further, the support housing 200 may be a diaphragm or nozzle in the power generation turbine. However, it should be appreciated that the brush seal assembly and method of the invention may be utilized in a wide variety of environments and are not limited to use in the operating environment of a power generation turbine.

It should be appreciated that the brush seal in accordance with some embodiments of the invention does not have to be a full circle. Rather, a brush seal, utilizing the techniques of the invention, might be made up of annular segments. Such annular segments might be joined so as to form a complete circle, i.e., so as to provide a brush seal that forms a complete circle.

As shown in FIG. 1, the brush seal 100 includes a support portion 102. For purposes of explanation, the support portion 102 may be characterized as having a front side 104, i.e., a portion of the support portion, and a back side 106, i.e., a portion of the support portion that opposes the front side 104 as shown by the numerical identifiers in FIG. 1. For example, the front side 104 might be disposed on the side of the brush seal 100 that is exposed to higher pressure than the back side 106. A set of bristles 108 extend from the support portion 102 toward the rotating shaft 300. The set of bristles 108 may be securely attached to the support portion 102 in any suitable manner.

Also, the brush seal 100 includes two plates which may be characterized, for purposes of explanation, as a front plate 110 and a back plate 112. The set of bristles 108 is sandwiched between the front plate 110 and the back plate 112 in accordance with the embodiment of the invention shown in FIG. 1. Accordingly, the front plate 110 and the back plate 112 may provide support for the set of bristles 108 in an axial direction along an axis 301 of the rotating shaft 300. The front plate 110 may be spaced from the set of bristles 108 so as to provide a gap 130. A flexible damper shim (not shown) may be placed in the gap 130 up against the set of bristles 108, i.e., to keep the bristles in the set of bristles 108 from fluttering without rigidly restricting the bristles.

It should be appreciated that the particular structure and shape of the front plate 110 and the back plate 112 may vary as desired. For example, the front plate 110 may be in the form of a long front plate in a brush seal, or a brush seal may be provided with a short front plate, or alternatively, a brush seal might be provided with a damper shim instead of a front plate. The invention may be utilized in all such cases, as well as where there is no front plate. Further, the "front plate" does not have to be in the form of a plate, but rather may be any suitable structure that provides support to the set of bristles 108.

In accordance with the embodiment of the invention as shown in FIG. 1, the front plate 110 and the back plate 112 may be attached to the support portion 102 in any suitable manner. Alternatively, it should be appreciated that the front plate 110, the back plate 112 and the support portion 102 may be integrally formed, such as in a suitable casting or molding process, for example. Further, it should be appreciated that the brush seal 100, including the support portion 102, the front plate 110 and the back plate 112, may be constructed using any of a wide variety of materials. The particular materials or material chosen may depend on the particular application and the particular needs of that application.

In accordance with one embodiment of the brush seal and method of the invention, the brush seal 100, as shown in FIG. 1, also includes fitting portions 120. Specifically, FIG. 1 shows that the brush seal 100 includes two fitting portions 120. That is, the brush seal 100 includes a front fitting portion 122 and a back fitting portion 124. The front fitting portion 122 extends from the support portion 102 in a leftward direction as shown in FIG. 1. The back fitting portion 124 extends in an opposing direction to the front fitting portion 122. Specifically, the back fitting portion 124 extends from the support portion 102 in a rightward direction as shown in FIG. 1.

In accordance with one embodiment as shown in FIG. 1, the front fitting portion 122 and the back fitting portion 124 may each be integrally formed with the support portion 102. Alternatively, the front fitting portion 122 and/or the back fitting portion 124 may be constructed separately from the support portion 102, and thereafter, attached to the support portion 102 in a suitable manner. The fitting portions 120 mate with the support housing 200, due to their corresponding geometry, in such a manner so as to prevent incorrect installation of the brush seal 100 in the support housing 200.

As used herein, the "geometry" of a component, or structural element, means both the shape of the component, as well as the dimensions of the component, for example. Two components that have a "corresponding geometry" will "mate" with each other. If the two components do not have a corresponding geometry, such two components will not mate with each other, i.e., the two components possess an "incompatible geometry." Accordingly, for example, the incompatibility of two components may be a result of incompatible shape or an incompatible dimension.

FIG. 1 also shows the support housing 200. The support housing 200 includes an annular slot 202. The slot 202 may of course be in the form of a chamber or any other suitable cavity. The slot 202 is adapted to mate with the support portion 102 and the fitting portions 120 of the brush seal 100. The slot 202 includes a back slot portion 204 and a front slot portion 206. The back fitting portion 124, which is connected to and extends from the support portion 102, is configured to mate with the back slot portion 204 in the support housing 200. As a result, this fit of the back fitting portion 124 into the back slot portion 204 assists in the prevention of a mis-fit brush seal in the support housing 200.

Further, the slot 202 includes the front slot portion 206. The front fitting portion 122 is connected to and extends from the support portion 102, as described above. The front fitting portion 122 is configured to mate with the front slot portion 206 in the support housing 200. This fit of the front fitting portion 122 in the front slot portion 206 further prevents a mis-fit of the brush seal 100 in the support housing 200.

As shown in FIG. 1, in accordance with one embodiment of the invention, the support housing 200 includes a front support housing portion 208 and a back support housing portion 210. The front support housing portion 208 and the back support housing portion 210 are separate parts that are positioned adjacent to and connected to one another along an interface line 212. Such assembly of the front support housing portion 208 and the back support housing portion 210 provides a technique for installing the brush seal 100 within the support housing 200.

For example, prior to assembly of the front support housing portion 208 together with the back support housing portion 210, the front fitting portion 122 may be positioned in the front slot portion 206. Then, the back support housing portion 210 may be moved into position such that the back fitting portion 124 is positioned within the back slot portion 204. If the "geometry" of the front fitting portion 122 and the geometry of the back fitting portion 124 does not match with the geometry of the front slot portion 206 and the back slot portion 204, respectively, then that particular brush seal 100 is not intended to be inserted into that particular slot in the support housing 200, i.e., the brush seal has an incompatible geometry with the slot of the support housing.

Alternatively, the support housing 200, for example a nozzle structure, may not be provided with the interface line 212. Rather, a brush seal 100 may be slid in from a side of the support housing 200 since the support housing may be segmented.

Accordingly, such illustrative assembly techniques described above are merely exemplary. The brush seal 100 and the support housing 200 may be assembled in any suitable manner as desired. Further, the structure of the brush seal 100 and the support housing 200 may be designed to allow assembly as is desired.

Figure 2:
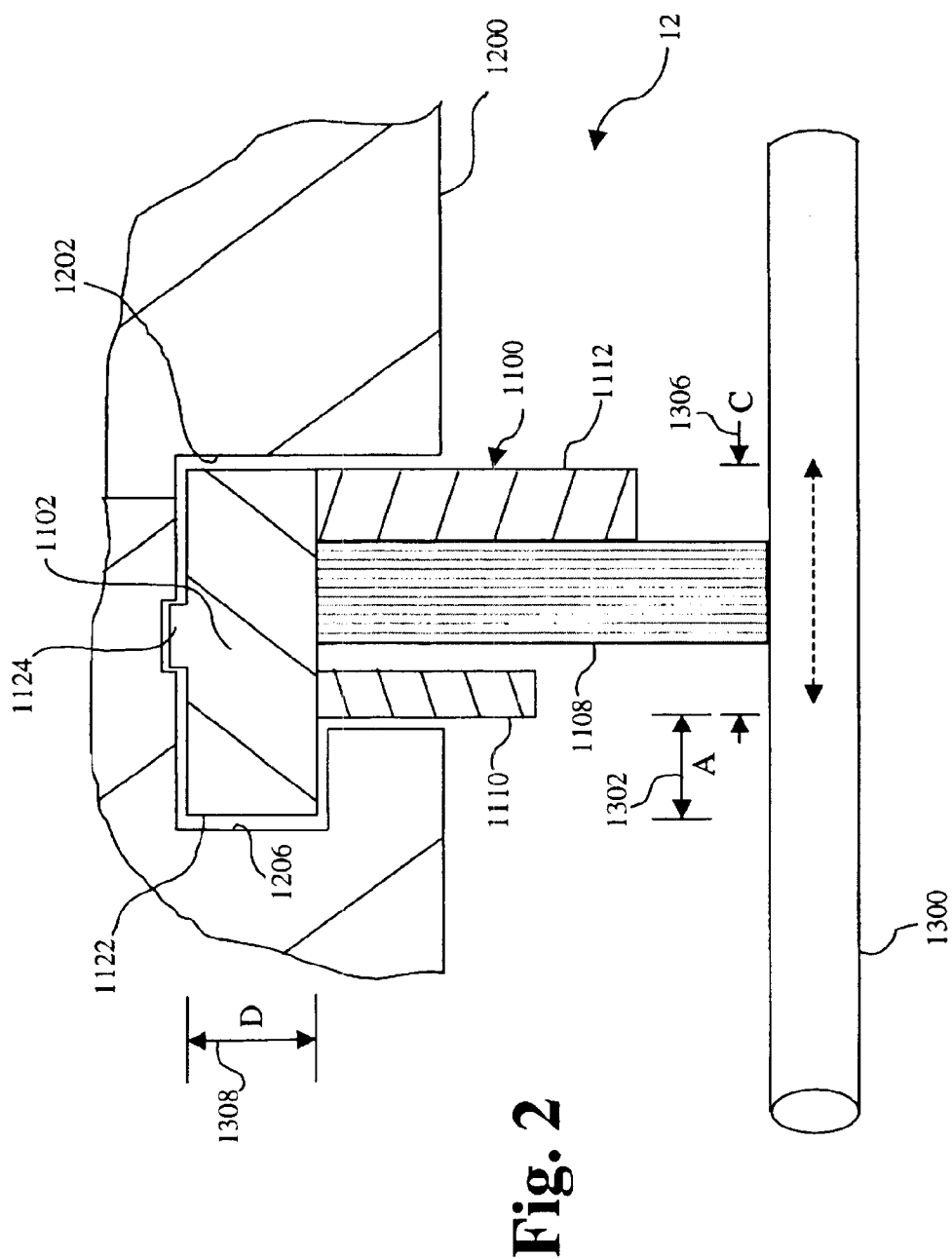
FIG. 2 is a cross-sectional diagram of a housing and brush seal in accordance with a further embodiment of the invention.

FIG. 2 illustrates further aspects of the brush seal of the invention. FIG. 2 shows an annular shaped brush seal assembly 12. The brush seal assembly 12 includes a brush seal 1100 mounted in a support housing 1200. The brush seal 1100 includes a support portion 1102 and a set of bristles 1108. Also, the brush seal 1100 includes a front fitting portion 1122, which is integrally connected to the support portion 1102. The brush seal 1100 is in the form of a circle, i.e., annular, enclosing the rotating shaft 1300.

As shown in FIG. 2, the support housing 1200 further includes a slot 1202 having a front slot portion 1206. The geometry of the front slot portion 1206 is such that the front slot portion 1206 mates with the front fitting portion 122. In contrast to the back fitting portion 124 of the brush seal 100 showed in FIG. 1, the brush seal 1100 does not include a back fitting portion. Accordingly, it should be appreciated that any of a wide variety of fitting portions may be disposed on the support portion 1102 so as to prevent a mis-fit of a brush seal 1100.

For example, the brush seal 1100 may also include a side fitting portion 1124, which is also integrally connected to the support portion 1102. The side fitting portion 1124 is also provided so as to mate with the slot 1202.

With further reference to FIG. 1 and FIG. 2, the cross-section of a brush seal might be characterized as having either a T-shape or an L-shape. That is, the brush seal 100 as shown in FIG. 1 may be characterized as having a T-shape due to the front fitting portion 122 and the back fitting portion 124. In contrast, the brush seal 1100 of FIG. 2, may be characterized as having an L-shape as a result of the presence of only the front fitting portion 1122.

FIG. 1, as well as FIG. 2, also illustrates various dimensions of the brush seal 100. The dimension A 302 in FIG. 1 defines the amount the front fitting portion 122 extends from the support portion 102. The dimension B 304 defines the amount the back fitting portion 124 extends from the support portion 102. Further, the dimension C 306, as shown in FIG. 1, defines the collective width of the front plate 110, the set of bristles 108, and the back plate 112. It should be appreciated that by making dimension A 302 not equal to dimension B 304, a brush seal 100 can only be installed into a slot in one direction. In addition as shown in FIG. 1, the dimension D 308 defines the width of the front fitting portion 122. Further, the dimension E 310 defines the width of the back fitting portion 124.

The dimension A 1302 in FIG. 2 defines the amount the front fitting portion 1122 extends from the support portion 1102. There is no dimension B since there is no back fitting portion, in contrast to FIG. 1, thus precluding the brush seal 1100 from being installed into a slot in the wrong direction. Further, the dimension C 1306, as shown in FIG. 2, defines the collective width of the front plate 1110, the set of bristles 1108, and the back plate 1112. In addition as shown in FIG. 2, the dimension D 1308 defines the width of the front fitting portion 1122.

It should be appreciated that any of the dimensions (302, 304, 306, 308, 310) of FIG. 1, for example, may be varied so as to vary the geometry of the brush seal 100. Relative to FIG. 1, FIG. 2 illustrates an example of such variance. That is, the dimension B 304 of FIG. 1 is reduced to zero (0) in the brush seal 1100 as shown in FIG. 2. As a result, the L-shape of the brush seal 1100, shown in FIG. 2, might be considered a special case of the T-shape of the brush seal 100 of FIG. 1, i.e., the dimension B 304 has been set to zero (0). Alternatively, an L-shaped brush seal might be generated by reducing the dimension A 302 shown in FIG. 1 to zero (0).

As is described above, multiple brush seals may typically be used in the same machine. These multiple brush seals may be of different construction. The various dimensions (302, 304, 306, 308, 310) of FIG. 1, for example, may be adjusted, as is desired, to provide the brush seals with a particular geometry such that each brush seal can only be installed in the right slot, i.e., location, and in the right direction. Further, the varied geometries can be created using a variety of techniques. For example, the varied geometries of the fitting portions of the brush seals of the invention may be effected utilizing standard machining processes, molding processes, casting processes, or any other suitable process to generate the desired geometry.

Figure 3:
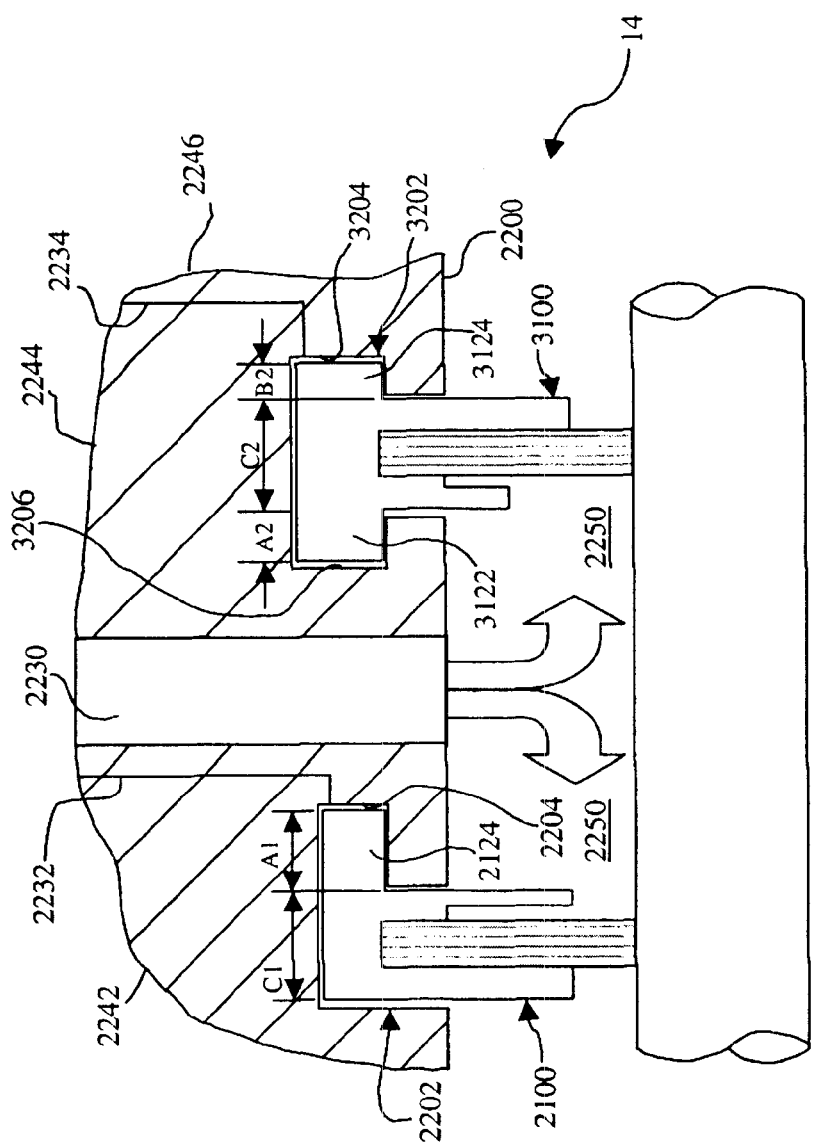
FIG. 3 is a cross-sectional diagram showing a housing and an arrangement of two brush seals in the housing in accordance with a further embodiment of the invention.

FIG. 3 is a cross-sectional diagram of a further brush seal assembly 14 in accordance with one embodiment of the invention. As shown in FIG. 3, the brush seal assembly 14 includes a brush seal 2100 and a brush seal 3100. The brush seal assembly 14 also includes a support housing 2200. The support housing 2200 is separable along connection interfaces (2232, 2234) so as to allow assembly of the brush seal 2100 and a brush seal 3100 in the support housing 2200, i.e., the support housing may be taken apart into three separate pieces (2242, 2244, 2246) so as to allow the installation of the brush seal 2100 and the brush seal 3100. Specifically, the support housing 2200 also includes a slot 2202 and a slot 3202 for receiving brush seals that are "compatible" with the slot 2202 and the slot 3202, respectively.

The slot 3202 includes a slot portion 3204 and a slot portion 3206 to insure proper installation of a brush seal. Accordingly, the fitting portions of a correct brush seal must be compatible with the slot 3202 and the fitting portions thereof. If not, then such a condition is indicative of an incorrect brush seal.

Also, the slot 2202 includes a slot portion 2204 to insure proper installation of a brush seal. Accordingly, the fitting portion of a correct brush seal must be compatible with the slot 2202 and the fitting portion thereof. If not, then such a condition is indicative of an incorrect brush seal.

FIG. 3 also shows an illustrative operating situation to which the brush seals (2100, 3100) might be exposed. Specifically, FIG. 3 shows an intake passage 2230 through which pressurized gas, or other mixture, may be input into an annular region or volume 2250. This region 2250, for example, is part of a cooling circuit for a gas path component, i.e., a nozzle or a bucket. In order to ensure that the cooling flow gets to the gas path component, for example, this region 2250 should have good sealing or else the gas path component will not receive its needed cooling flow. As a result, the gas path component will fail prematurely.

Accordingly, the brush seals (2100, 3100) restrict the passage of the pressurized gas past the brush seals (2100, 3100). As a result, the input of pressurized gas may increase the pressure in the region or volume 2250 between the brush seal 2100 and the brush seal 3100, above the pressure outside such volume 2250, resulting in a large pressure gradient across the brush seals. The brush seals are typically designed for such anticipated pressure gradients. However, such brush seals will of course not perform properly if installed incorrectly, i.e., if a mis-fit occurs.

FIG. 3 shows the two brush seals (2100, 3100) correctly positioned in the support housing 2200. Specifically, the brush seal 2100 includes a fitting portion 2124. The fitting portion 2124 is correctly positioned in the slot portion 2204.

Also, the brush seal 3100 includes a fitting portion 3124 and a fitting portion 3122. The fitting portion 3124 is correctly positioned in the slot portion 3204. The fitting portion 3122 is correctly positioned in the slot portion 3206. As is apparent from FIG. 3, the geometry associated with the fitting portions for each of the brush seals (2100, 3100) are such as to preclude a mis-fit of the brush seals.

In further explanation, the brush seal 2100 of FIG. 3 is L-shaped so as to preclude installment of the brush seal 2100 in the wrong direction. Further, comparing the brush seal 2100 with the brush seal 3100, the brush seal 2100 can not be accidentally installed in the slot 3202 of the support housing 2200. This accidental installation is precluded since the dimension A1 is greater than the dimension A2 and since the dimension B2 of the brush seal 3100 is greater than a "dimension B" of the brush seal 2100, i.e., the dimension B of the brush seal 2100 is zero. Further, it should be appreciated that the T-shaped brush seal 3100 can not be inserted into the slot 2202 in the support housing 2200. While not shown in FIG. 3, it should further be appreciated that the dimension C1 might be different than the dimension C2, as shown in FIG. 3, so as to further preclude mis-fit of a brush seal.

Figure 4:
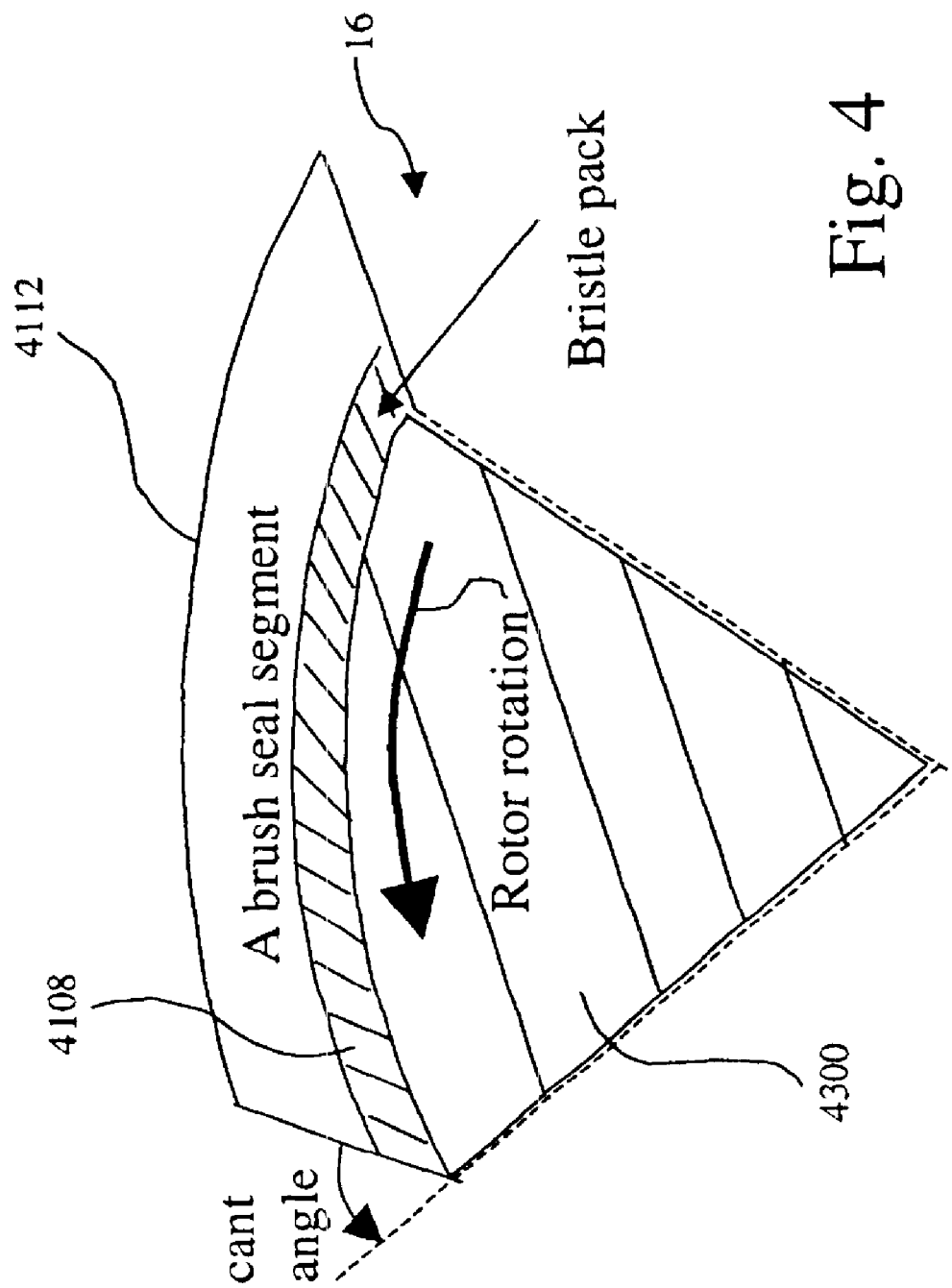
FIG. 4 is a diagram illustrating aspects of the cant angle of a set of bristles of a brush seal in accordance with one embodiment of the invention.

As discussed above, assembly of a brush seal with the cant angle of the set of bristles in the wrong direction, will cause immediate damage to the brush seal. The brush seal and method of using the brush seal of the invention provide for the cross-section of a brush seal to be constructed in such a way, in conjunction with a support housing, such that the brush seal cannot be installed in the wrong direction. FIG. 4 further illustrates this concept.

FIG. 4 is a schematic diagram showing a brush seal segment 16 positioned around a rotor 4300. The brush seal segment 16 includes a supporting plate 4112, similar to the back plate 112 of FIG. 1. The brush seal segment 16 also includes a bristle pack made up of a set of bristles 4108. The rotation of the rotor 4300 as shown in FIG. 4 is counter-clockwise. As a result, the cant angle disposes each bristle in the set of bristles 4108 to physically exert pressure on the rotor 4300, but in such a manner that the rotor pulls on each bristle. This is in contrast to pushing on each bristle, due to the frictional force between the rotor 4300 and the bristles, if the cant angle is incorrect, i.e., if the brush seal is installed incorrectly and the rotor movement is against the cant angle direction. Thus, avoiding a mis-fit, for example a reverse fit, of a brush seal is particularly important when the cant angle is not equal to zero or 90 degrees relative to a radius of the annular brush seal. The brush seal and method of using the brush seal in accordance with the various embodiments above avoid such incorrect installation.

In accordance with further aspects of the invention, a kit of brush seals might be provided for installation into a particular turbine, for example, or other operating system. The kit of brush seals may include a number of identical brush seals, as well as different brush seals. In accordance with aspects of the invention as described above, the different brush seals in the kit may be provided with different fitting portions. Such different fitting portions preclude a brush seal from being installed incorrectly, such as in a wrong direction or in the wrong location. That is, a particular fitting portion of a brush seal will not be compatible with an incorrect slot in a support housing into which the brush seal is attempted to be positioned.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure, which includes the attachments, is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A brush seal, in combination with a second brush seal, for providing a seal between a support housing and a rotating shaft, the brush seal comprising:

a support portion;

a back plate connected to and extending from the support portion on a back side of the support portion;

a set of bristles attached to the support portion, the back plate disposed on a back side of the set of bristles and supporting the set of bristles; and at least one fitting portion connected to and extending from the support portion, each of the at least one fitting portion configured to mate with a corresponding slot in the support housing so as to prevent mis-fit of the brush seal in an incorrect slot in the support housing; and the second brush seal including a second support portion, a second back plate connected to and extending from the second support portion, a second set of bristles attached to the second support portion, and at least one second fitting portion connected to and extending from the second support portion, each of the at least one second fitting portion configured to mate with a second corresponding slot in the support housing so as to prevent mis-fit of the second brush seal in an incorrect slot in the support housing; and wherein the at least one fitting portion is geometrical shaped different than the at least one second fitting portion so as to fit into respective matching slots in the support housing.

2. The brush seal according to claim 1, wherein the at least one fitting portion is connected to and extends from the front side of the support portion.

3. The brush seal according to claim 1, wherein the at least one fitting portion is connected to and extends from the back side of the support portion.

4. The brush seal according to claim 1, wherein the at least one fitting portion is two fitting portions, the two fitting portions including a front fitting portion and a back fitting portion, and wherein:

the front fitting portion is connected to and extends from the front side of the support portion; and the back fitting portion is connected to and extends from the back side of the support portion.

5. The brush seal according to claim 4, wherein the front fitting portion and the back fitting portion extend in opposing directions from, and parallel to, each other.

6. The brush seal according to claim 4, wherein the at least one fitting portion further includes a side fitting portion, the side fitting portion extending from the support portion in a direction normal to an axis of the rotating shaft.

7. The brush seal according to claim 4, wherein the front fitting portion having a geometry and the back fitting portion having a geometry, the geometry of the front fitting portion being different than the geometry of the back fitting portion.

8. The brush seal according to claim 1, wherein the at least one fitting portion is a side fitting portion, the side fitting portion extending from the support portion in a direction normal to an axis of the rotating shaft.

9. The brush seal according to claim 1, wherein the support portion is integrally formed with each of the at least one fitting portion.

10. The brush seal according to claim 9, wherein the support portion is integrally formed with the back plate.

11. A method for preventing the mis-fit of a brush seal and an additional brush seal into respective slots within a support housing, the slots having geometrical dimensions, and the brush seal and the additional brush seal for providing a seal between the support housing and a rotating shaft, the method comprising the steps of:
  providing a brush seal, the brush seal comprising:
    a support portion;
    a back plate connected to and extending from the support portion on a back side of the support portion;
    a set of bristles attached to the support portion, the back plate disposed on a back side of the set of bristles and supporting the set of bristles; and
    at least one fitting portion connected to and extending from the support portion, each of the at least one fitting portion configured to mate with the respective slot in the support housing;
  determining a geometry of at least one of the slots in the support housing;
  determining if the at least one fitting portion of the brush seal possesses a geometry that corresponds to a geometry of the at least one of the slots;
  positioning the at least one fitting portion within the support housing, so as to connect the brush seal with the support housing, when the at least one fitting portion possesses a geometry that corresponds to the geometry of the at least one of the slots of the support housing; and
  obtaining the additional brush seal when the at least one fitting portion of the brush seal does not possess a geometry that corresponds to the geometry of the at least one of the slots of the support housing;
  and fitting the additional brush seal, which does possess a fitting portion that corresponds to the geometry of the at least one of the slots, in the support housing.

12. The method according to claim 11, wherein the at least one fitting portion is connected to and extends from the front side of the support portion.

13. The method according to claim 11, wherein the at least one fitting portion is connected to and extends from the back side of the support portion.

14. The method according to claim 11, wherein the at least one fitting portion is two fitting portions, the two fitting portions including a front fitting portion and a back fitting portion, and wherein:
  the front fitting portion is connected to and extends from the front side of the support portion;
  the back fitting portion is connected to and extends from the back side of the support portion, the front fitting portion having a geometry and the back fitting portion having a geometry, the geometry of the front fitting portion being different than the geometry of the back fitting portion.

15. The method of claim 14, wherein the support housing includes a front support housing portion having a front slot portion and a back support housing portion having a back slot portion, the front support housing portion being engageable with the back support housing portion such that the front slot portion and the back slot portion collectively form the at least one of the slots; and
  wherein the step of determining if the at least one fitting portion of the brush seal possesses geometrical dimensions that correspond to the geometrical dimensions of the at least one of the slots includes:
    determining if the front fitting portion of the brush seal possesses geometrical dimensions that correspond to the front slot portion; and
    determining if the back fitting portion of the brush seal possesses geometrical dimensions that correspond to the back slot portion.

16. A kit of brush seals for providing a seal between a support housing and a rotating shaft, the kit of brush seals including:
  a first brush seal, the first brush seal including:
    a first support portion;
    a first back plate connected to and extending from the first support portion on a back side of the first support portion;
    a first set of bristles attached to the first support portion, the first back plan disposed on a back side of the first set of bristles and supporting the first set of bristles; and
    at least one first fitting portion connected to and extending from the first support portion, each of the at least one first fitting portion configured to mate with a first corresponding slot in the support housing so as to prevent mis-fit of the first brush seal in an incorrect slot in the support housing; and
  a second brush seal, the second brush seal including:
    a second support portion;
    a second back plate connected to and extending from the second support portion on a back side of the second support portion;
    a second set of bristles attached to the second support portion, the second back plate disposed on a back side of the second set of bristles and supporting the second set of bristles; and
    at least one second fitting portion connected to and extending from the second support portion, each of the at least one second fitting portion configured to mate with a second corresponding slot in the support housing so as to prevent mis-fit of the second brush seal in an incorrect slot in the support housing;
  wherein the at least one first fitting portion is geometrical shaped different than the at least one second fitting portion;
  wherein each of the first brush seal and the second brush seal is fittable into a first slot in the support housing and a second slot in the support housing, respectively; and
  wherein each of the first brush seal and the second brush seal is not fittable into the second slot in the support housing and the first slot in the support housing, respectively.

17. A brush seal, in combination with a second brush seal, for providing a seal between a support housing and a rotating shaft, the brush seal comprising:
  a support portion;
  a back plate connected to and extending from the support portion on a back side of the support portion;
  a front plate connected to and extending from the support portion on a front side of the support portion;
  a set of bristles attached to the support portion, the back plate disposed on a back side of the set of bristles and supporting the set of bristles, and the front plate disposed on a front side of the set of bristles and supporting the set of bristles; and
  at least one fitting portion connected to and extending from the support portion, each of the at least one fitting portions configured to mate with a corresponding slot in the support housing so as to prevent mis-fit of the brush seal in an incorrect slot in the support housing, the support portion being integrally formed with each of the at least one fitting portions; and the second brush seal including a second support portion, a second back plate connected to and extending from the second support portion, a second set of bristles attached to the second support portion, and at least one second fitting portion connected to and extending from the second support portion, each of the at least one second fitting portion configured to mate with a second corresponding slot in the support housing so as to prevent mis-fit of the second brush seal in an incorrect slot in the support housing; and wherein the at least one fitting portion is geometrical shaped different than the at least one second fitting portion so as to fit into respective matching slots in the support housing.

18. The brush seal according to claim 17, wherein the at least one fitting portion is connected to and extends from the front side of the support portion.

19. The brush seal according to claim 17, wherein the at least one fitting portion is two fitting portions, the two fitting portions including a front fitting portion and a back fitting portion, and wherein:

the front fitting portion is connected to and extends from the front side of the support portion; and the back fitting portion is connected to and extends from the back side of the support portion, wherein the front fitting portion is a different geometry than the back fitting portion.

20. The brush seal according to claim 19, wherein the front fitting portion and the back fitting portion extend in opposing directions from, and parallel to, each other.

21. A method for preventing the mis-fit of a brush seal and an additional brush seal into respective slots within a support housing in a turbine, the slots having geometrical dimensions, the brush seal and the additional brush seal for providing a seal between the support housing in the turbine and a rotating shaft, the method comprising the steps of:

providing a brush seal, the brush seal comprising:
a support portion;
a front plate connected to and extending from the support portion on a front side of the support portion;
a back plate connected to and extending from the support portion on a back side of the support portion;
a set of bristles attached to the support portion, the back plate disposed on a back side of the set of bristles and supporting the set of bristles, the front plate disposed on a front side of the set of bristles and supporting the set of bristles; and
at least one fitting portion connected to and extending from the support portion, each of the at least one fitting portion configured to mate with the respective slot in the support housing;

determining a geometry of at least one of the slots in the support housing;

determining if the at least one fitting portion of the brush seal possesses geometry that corresponds to a geometry of the at least one of the slots ;

positioning the at least one fitting portion within the support housing, so as to connect the brush seal with the support housing, when the at least one fitting portion possesses a geometry that corresponds to the geometry of the at least one of the slots of the support housing; and obtaining the additional brush seal when the at least one fitting portion of the brush seal does not possess a geometry that corresponds to the geometry of the at least one of the slots of the support housing;

wherein the at least one fitting portion is two fitting portions, the two fitting portions including a front fitting portion and a back fitting portion, and wherein:
the front fitting portion is connected to and extends from the front side of the support portion; and
the back fitting portion is connected to and extends from the back side of the support portion, the front fitting portion having a geometry and the back fitting portion having a geometry, the geometry of the front fitting portion being different than the geometry of the back fitting portion; and fitting the additional brush seal, which does possess a fitting portion that corresponds to the geometry of the at least one of the slots, in the support housing.

* * * * *